US010851002B2

(12) United States Patent
Bower et al.

(10) Patent No.: US 10,851,002 B2
(45) Date of Patent: Dec. 1, 2020

(54) SYSTEMS AND METHODS FOR DETERMINING OPERATING CONDITIONS OF ROTATING BIOLOGICAL CONTACTOR

(71) Applicant: Regal Beloit America, Inc., Beloit, WI (US)

(72) Inventors: Zachary Alan Bower, Janesville, WI (US); David Silverman, Medina, OH (US); Patrick Drew Cronin, Walworth, WI (US)

(73) Assignee: Regal Beloit America, Inc., Beloit, WI (US)

( * ) Notice: Subject to any disclaimer, the term of this patent is extended or adjusted under 35 U.S.C. 154(b) by 28 days.

(21) Appl. No.: 16/164,981

(22) Filed: Oct. 19, 2018

(65) Prior Publication Data

US 2020/0123034 A1 Apr. 23, 2020

(51) Int. Cl.
C02F 3/00 (2006.01)
G01L 3/10 (2006.01)
C02F 3/08 (2006.01)

(52) U.S. Cl.
CPC ............. *C02F 3/006* (2013.01); *C02F 3/082* (2013.01); *G01L 3/108* (2013.01); *C02F 2203/006* (2013.01); *C02F 2209/005* (2013.01)

(58) Field of Classification Search
CPC .... C02F 3/006; C02F 3/082; C02F 2203/006; C02F 2209/005; G01L 3/108
USPC ......................................................... 210/619
See application file for complete search history.

(56) References Cited

U.S. PATENT DOCUMENTS

| 3,516,929 A | 6/1970 | Welch |
| 4,137,172 A | 1/1979 | Sako |
| 4,504,393 A | 3/1985 | Davies |
| 4,729,828 A | 3/1988 | Miller |

(Continued)

FOREIGN PATENT DOCUMENTS

| FR | 2007907 A1 | 1/1970 |
| KR | 100989105 B1 | 10/2010 |

OTHER PUBLICATIONS

Rice Lake Weighing Systems, "Weigh Modules & Vessel Weighing Systems: Installation and System Guidelines". (Year: 1997).*

(Continued)

*Primary Examiner* — Nam X Nguyen
*Assistant Examiner* — Julia L. Wun
(74) *Attorney, Agent, or Firm* — Armstrong Teasdale LLP

(57) ABSTRACT

A system for determining operating conditions of a rotating biological contactor includes a sensor including a first end coupleable to the gearbox assembly of the rotating biological contactor at a radial distance from a rotation axis of a rotatable shaft. The rotatable shaft rotates a plurality of media elements about the rotation axis to treat water within a basin of the rotating biological contactor. The sensor also includes a second end coupleable to a brace to prevent rotation of the sensor and the gearbox assembly when the rotatable shaft is rotated. The sensor further includes a body extending between the first end and the second end. The sensor is configured to detect a load on the body when the rotatable shaft is rotated. The system further includes a controller communicatively coupled to the sensor. The controller is configured to determine a torque of the rotatable shaft based on the load detected by the sensor.

20 Claims, 12 Drawing Sheets

(56) References Cited

U.S. PATENT DOCUMENTS

| | | | |
|---|---|---|---|
| 5,985,145 A * | 11/1999 | McEwen | F16H 1/16 |
| | | | 210/167.02 |
| 7,083,720 B2 | 8/2006 | Miller | |
| 9,046,431 B2 * | 6/2015 | Malhan | G01L 3/108 |
| 9,133,042 B2 | 9/2015 | Baxi | |
| 2011/0142634 A1 | 6/2011 | Menke | |
| 2012/0152834 A1 | 6/2012 | Baxi | |
| 2018/0031093 A1 * | 2/2018 | Seminel | B64C 13/341 |
| 2018/0113038 A1 * | 4/2018 | Janabi-Sharifi | G01L 1/26 |
| 2018/0297873 A1 | 10/2018 | Huddersman et al. | |

OTHER PUBLICATIONS

International Search Report and Written Opinion dated Jan. 7, 2020 for International Application No. PCT/US2019/056567.

\* cited by examiner

SYSTEMS AND METHODS FOR DETERMINING OPERATING CONDITIONS OF ROTATING BIOLOGICAL CONTACTOR

FIELD

The field of the disclosure relates generally to rotating biological contactors and, more specifically, a system that determines operating conditions of a rotating biological contactor based on torque from a gearbox assembly for the rotating biological contactor.

BACKGROUND

At least some water treatment systems include a rotating biological contactor that is used to biologically treat water. Typical rotating biological contactors include a rotor that is coupled to a motor by a gearbox assembly. A plurality of media elements, disks, or panels are mounted on the rotor and contact the water as the rotor is rotated by the motor via the gearbox assembly. Biological growth, e.g., microorganisms, collect on the surface of the panels and facilitate degradation of materials or pollutants in the water. As the rotor is rotated, portions of the media elements are alternatingly submerged in the water and exposed to air to provide aeration and facilitate the biological and degradation processes.

The rotating biological contactor provides a reliable and relatively simple process to treat water. However, sometimes the service life of the rotating biological contactor drive system is reduced due to operating conditions such as high torque or an imbalance in the load on the rotor and/or drive system of the rotating biological contactor. In addition, it is difficult to know such operating conditions of the rotating biological contactor prior to or even after cleaning or replacement of the media elements. Although some current systems include sensors to detect an overall weight of the rotating biological contactor, such sensors cannot provide information relating to high torque or imbalance of the rotating biological contactor.

Therefore, it would be desirable to provide a cost effective system for detecting operating conditions of the rotating biological contactor such as high torque or a load imbalance.

BRIEF DESCRIPTION

In one aspect, a system for determining operating conditions of a rotating biological contactor is provided. The rotating biological contactor includes a rotatable shaft, a plurality of media elements coupled to the rotatable shaft, and a gearbox assembly coupled to the rotatable shaft to cause rotation of the rotatable shaft. The system includes a sensor coupleable to the gearbox assembly of the rotating biological contactor. The sensor includes a first end coupleable to the gearbox assembly at a radial distance from a rotation axis of the rotatable shaft. The rotatable shaft rotates the plurality of media elements about the rotation axis to treat water within a basin of the rotating biological contactor. The sensor also includes a second end coupleable to a brace to prevent rotation of the sensor and the gearbox assembly when the rotatable shaft is rotated. The sensor further includes a body extending between the first end and the second end. The sensor is configured to detect a load on the body when the rotatable shaft is rotated. The system further includes a controller communicatively coupled to the sensor. The controller includes a processor and a memory. The controller is configured to determine a torque of the rotatable shaft based on the load detected by the sensor.

In another aspect, a rotating biological contactor is provided. The rotating biological contactor includes a basin configured to receive water for treatment, a rotatable shaft extending at least partially along the basin, and a plurality of media elements coupled to the rotatable shaft. The rotatable shaft rotates the plurality of media elements about a rotation axis to treat the water in the basin. The rotating biological contactor also includes a gearbox assembly coupled to the rotatable shaft and a motor coupled to the gearbox assembly and configured to drive rotation of the rotatable shaft via the gearbox assembly. The rotating biological contactor further includes a sensor coupled to the gearbox assembly. The sensor includes a first end coupled to the gearbox assembly at a radial distance from a rotation axis of the rotatable shaft and a second end coupled to a brace to prevent rotation of the sensor and the gearbox assembly when the rotatable shaft is rotated. The sensor also includes a body extending between the first end and the second end. The sensor is configured to detect a load on the body when the rotatable shaft is rotated.

In yet another aspect, a method for determining operating conditions of a rotating biological contactor is provided. The rotating biological contactor includes a rotatable shaft, a plurality of media elements coupled to the rotatable shaft, and a gearbox assembly coupled to the rotatable shaft to cause rotation of the rotatable shaft. The method includes coupling a first end of a sensor to the gearbox assembly at a radial distance from a rotation axis of the rotatable shaft and coupling a second end of the sensor to a brace to prevent rotation of the sensor and the gearbox assembly when the rotatable shaft is rotated. The method also includes rotating the rotatable shaft and the plurality of media elements about a rotation axis to treat water flowing through the rotating biological contactor. The method further includes measuring a load on the sensor when the rotatable shaft is rotated. The method also includes determining, using a controller communicatively coupled to the sensor, a torque of the rotatable shaft based on the load detected by the sensor and the radial distance between the first end and the rotation axis.

Although specific features of various embodiments may be shown in some drawings and not in others, this is for convenience only. Any feature of any drawing may be referenced and/or claimed in combination with any feature of any other drawing.

DETAILED DESCRIPTION

Embodiments of the systems and methods described herein enable the determination of operating conditions of a rotating biological contactor based on output torque from a gearbox assembly for the rotating biological contactor. More specifically, systems and methods described herein include a sensor assembly that is coupled to a gearbox assembly of the rotating biological contactor to replace a torque arm of the rotating biological contactor drive. A traditional torque arm extends between the gearbox assembly and a bracing point that is fixed with respect to the rotating biological contactor or anchored to the ground. Accordingly, the sensor assembly measures the torque of a shaft of the rotating biological contactor as the shaft rotates. Based on the measured torque, a controller is able to identify imbalances in the rotating biological contactor during operation of the rotating biological contactor. Moreover, operating conditions of the rotating biological contactor are evaluated by the controller and provided to an operator on a user interface. As a result, the operator may adjust operating conditions of the rotating biological contactor, clean the rotating biological contactor media, or add chemicals to the rotating biological contactor system to address any high load or load imbalances and prolong the service life of components of the rotating biological contactor.

Figure 1:
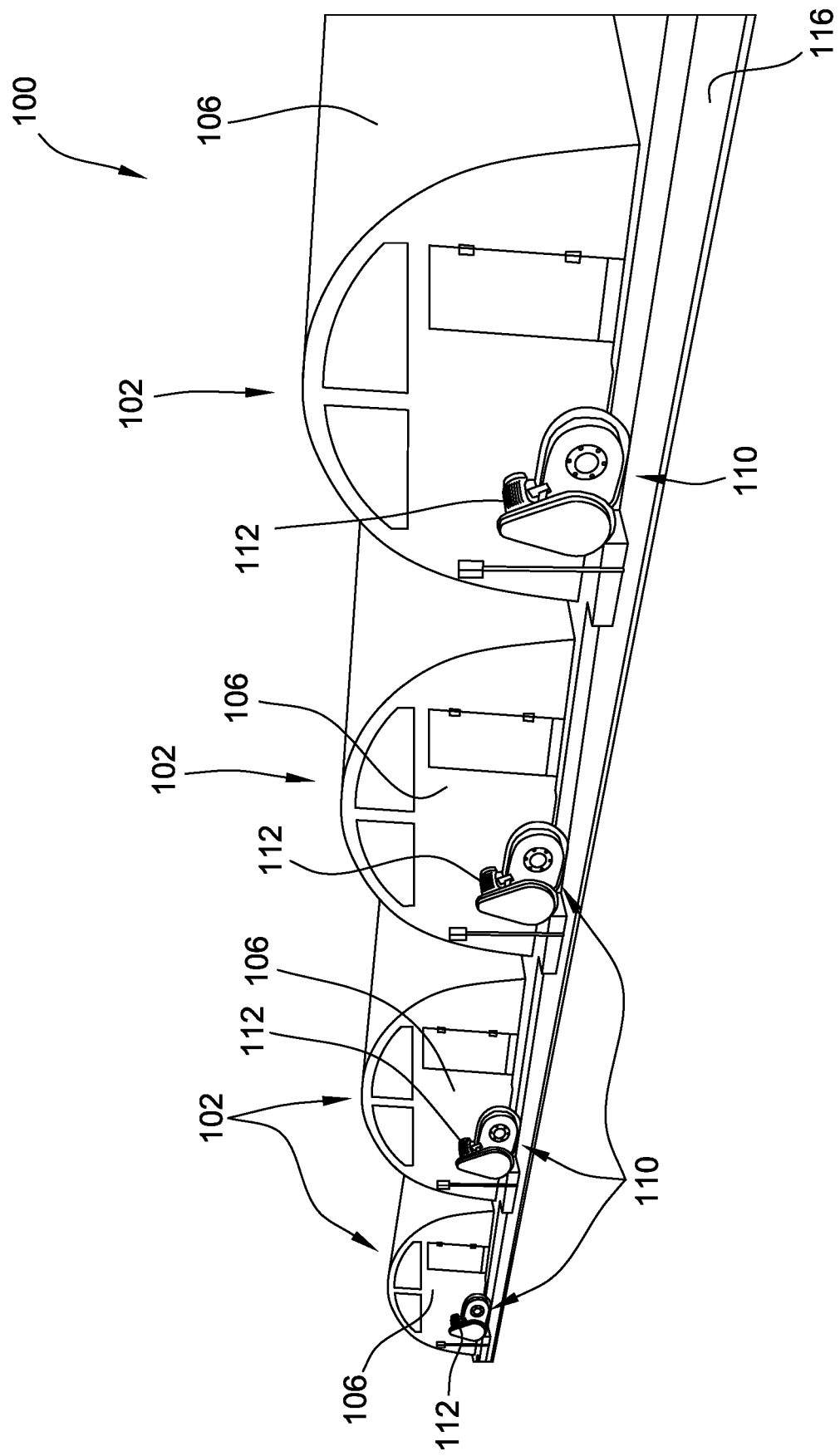
FIG. 1 is a perspective view of an example water treatment facility including a plurality of rotating biological contactors.

FIG. 1 is a perspective view of an example water treatment facility 100 including a plurality of rotating biological contactors 102. Rotating biological contactors 102 are used to treat the water with a biological treatment process. In some embodiments, water treatment facility 100 includes one or more treatment stages for water before or after the water is treated by rotating biological contactors 102. For example, in some embodiments, a primary treatment of water treatment facility includes removal of solid materials using a filtering and/or settling process before water is provided to rotating biological contactors 102. In alternative embodiments, water treatment facility 100 has any number or type of treatment stages that enable water treatment facility 100 to operate as described herein.

Figure 2:
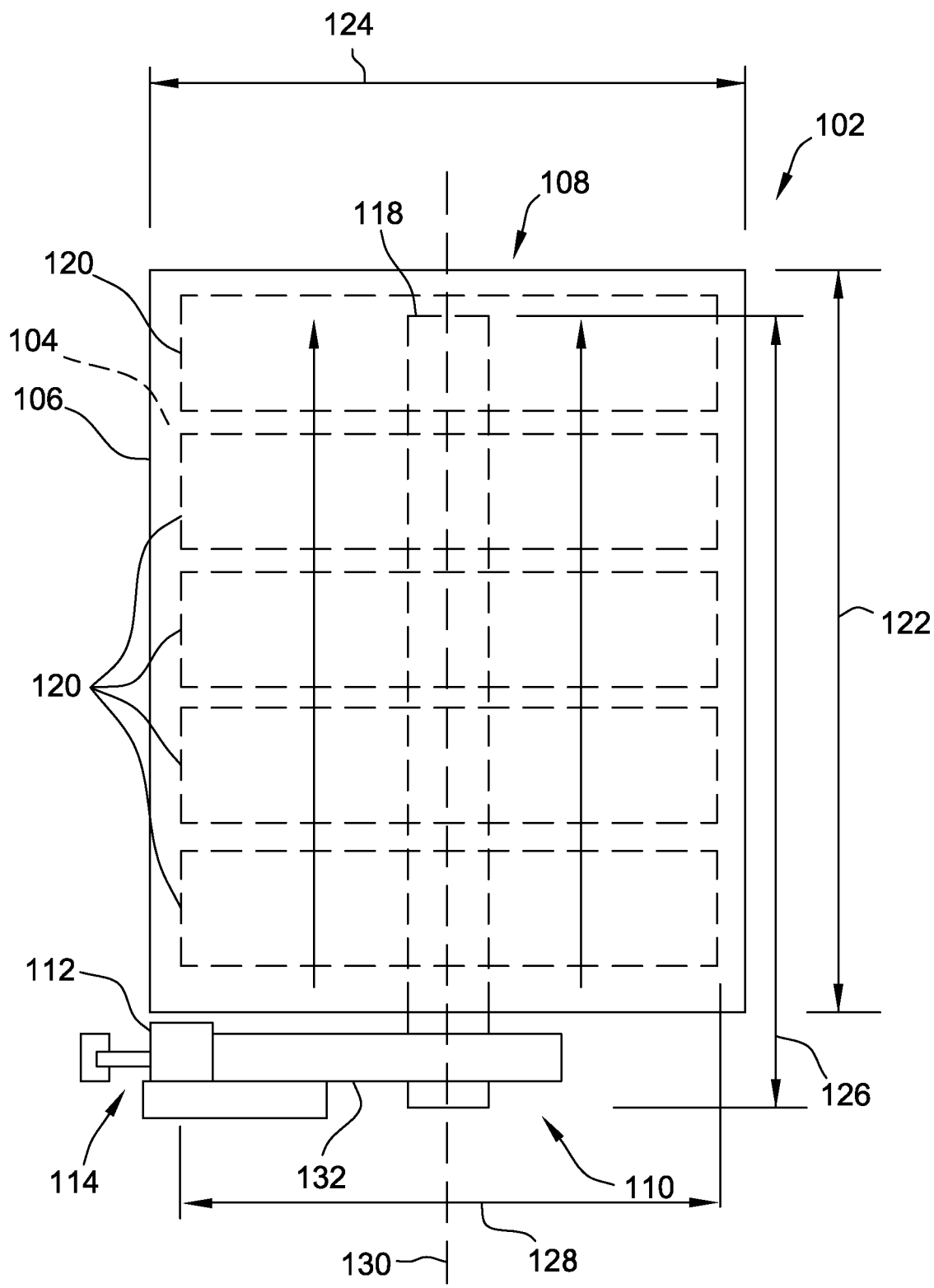
FIG. 2 is a plan view of one of the rotating biological contactors of the water treatment facility shown in FIG. 1.

FIG. 2 is a plan view of one of rotating biological contactors 102. Referring to both FIGS. 1 and 2, rotating biological contactor 102 includes a basin 104, a housing 106, a rotor 108, a gearbox assembly 110, a motor 112, and a sensor assembly 114. Basin 104 is configured to receive water for treatment. In some embodiments, basin 104 is positioned at least partially below the surface of ground 116 (shown in FIG. 1). In the exemplary embodiment, housing 106 at least partially covers basin 104 and rotor 108. In some embodiments, housing 106 is omitted. In alternative embodiments, rotating biological contactor 102 has any configuration that enables rotating biological contactor 102 to operate as described herein.

In the exemplary embodiment, rotor 108 includes a rotatable shaft 118 and a plurality of media elements 120, also referred to as disks or panels. Media elements 120 are coupled to rotatable shaft 118 and arranged axially in a closely-spaced series, along the length of rotatable shaft 118. In the exemplary embodiment, media elements 120 are circular and extend circumferentially around rotatable shaft 118. Media elements 120 are configured to contact water within basin 104 and facilitate biodegradation of materials carried by the water. In alternative embodiments, rotating biological contactor 102 includes any number, type, or shape of media elements 120 that enable rotating biological contactor 102 to operate as described herein.

Also, in the exemplary embodiment, basin 104 has a length 122 and a width 124. Rotatable shaft 118 is positioned longitudinally along basin 104 such that media elements 120 at least partially into basin 104 and contact water in basin 104. Rotatable shaft 118 has a length 126 that is substantially equal to or greater than length 122 of basin 104. As rotor 108 rotates, portions of each media element 120 are alternatingly submersed in the water and exposed to air above the water. In alternative embodiments, rotating biological contactor 102 includes any number, type, or shape of media elements 120 having any configuration that enables rotating biological contactor 102 to operate as described herein.

In addition, in the exemplary embodiment, the drive system for the rotating biological contactor includes motor 112 coupled to rotor 108 by gearbox assembly 110. Motor 112 is configured to rotate rotatable shaft 118 and media elements 120 about a rotation axis 130 via gearbox assembly 110. Motor 112 is any motor that is able to drive rotation of rotor 108. For example, in some embodiments, motor 112 includes a rotor (not shown) that rotates relative to a stator (not shown) when power is supplied to motor 112. In alternative embodiments, rotating biological contactor 102 includes any motor 112 that enables rotating biological contactor 102 to operate as described herein.

Moreover, in the exemplary embodiment, gearbox assembly 110 includes a housing 132 that encloses components of gearbox assembly 110. The output shaft of motor 112 and rotatable shaft 118 of rotor 108 are connected to the input shaft of the gearbox assembly by v-belt drive. Gearbox assembly 110 includes a plurality of gears (not shown) positioned within housing 132 between the output shaft of motor 112 and rotor 108. For example, the output shaft of motor 112 is drivingly coupled to the input shaft of gear of gearbox assembly 110 and another gear of gearbox assembly 110 is drivingly coupled to rotor 108. Gears of gearbox assembly 110 are drivingly engaged with each other and cause rotation of rotor 108 about rotation axis 130 when the output shaft of motor 112 rotates. In alternative embodiments, rotating biological contactor 102 includes any gearbox assembly 110 that enables rotating biological contactor 102 to operate as described herein.

Figure 3:
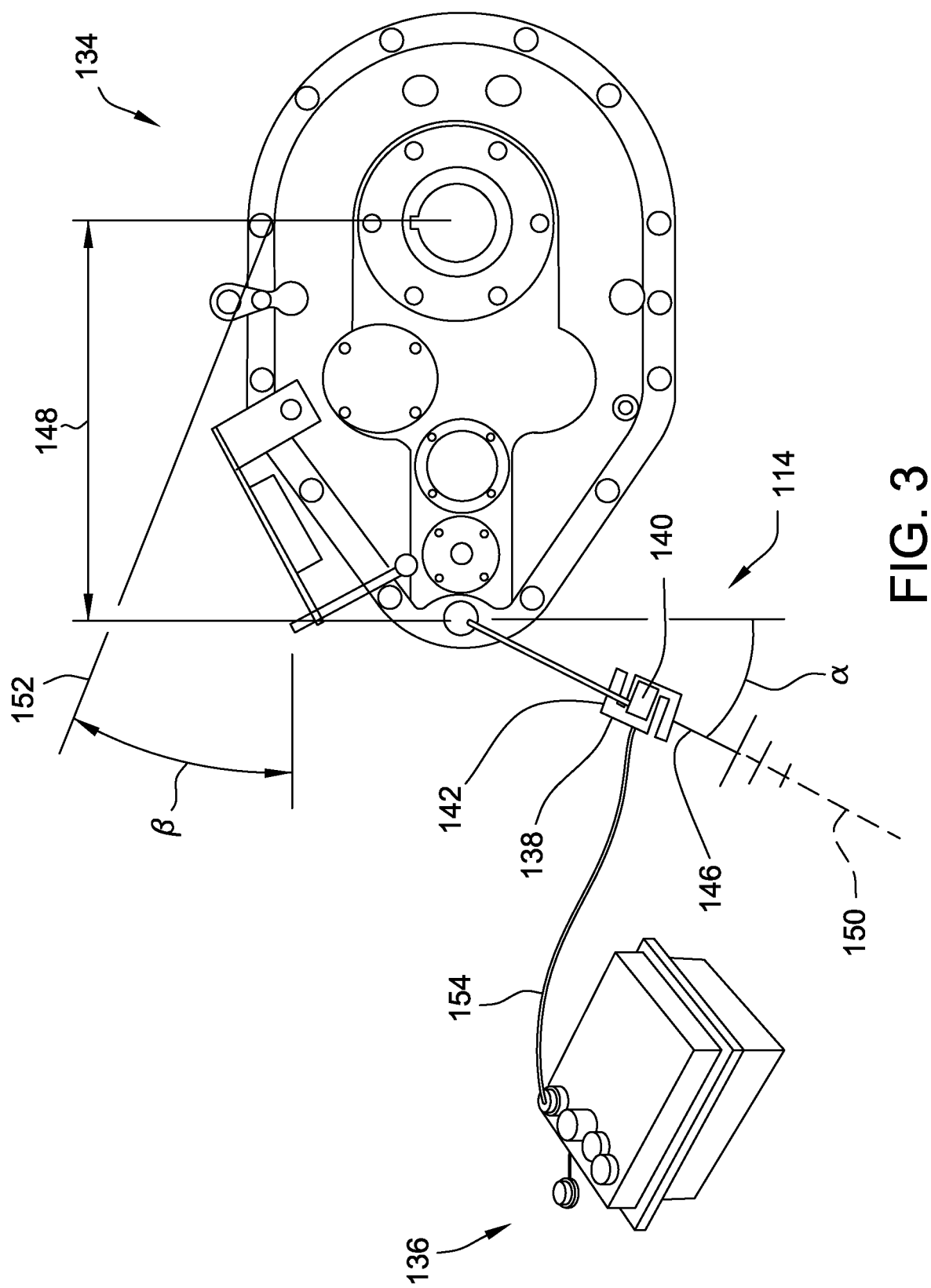
FIG. 3 is a perspective view of a system for determining operating conditions of the rotating biological contactor shown in FIGS. 1 and 2.

FIG. 3 is a perspective view of a system 134 for determining operating conditions of rotating biological contactor 102. System 134 includes sensor assembly 114 and a controller 136. Moreover, in the exemplary embodiment, sensor assembly 114 includes a sensor 138 having a body 140. Body 140 has a first end 142 releasably coupled to housing 132 of gearbox assembly 110 and a second end 144 releasably coupled to a brace 146. Specifically, sensor assembly 114 is configured to couple to gearbox assembly 110 and brace 146 in place of standard torque arms (not shown). Sensor assembly 114 acts to resist rotation of gearbox assembly 110 when rotatable shaft 118 (shown in FIG. 2) is rotated. As a result, torque loads on gearbox assembly 110 are transferred through sensor assembly 114 to brace 146. Brace 146 may include an anchor mounted to the ground and configured to receive loads from sensor assembly 114 without moving relative to rotating biological contactor shaft 118. In the exemplary embodiment, sensor 138 is mounted to housing 132 between first end 142 and second end 144. Accordingly, sensor 138 is positioned to detect loads on gearbox assembly 110 and sensor assembly 114 when rotatable shaft 118 (shown in FIG. 2) is rotated. Moreover, sensor 138 allows measurement of torque without upgrades or changes to rotating biological contactor 102 and facility 100. Moreover, sensor 138 directly measures torque of gearbox assembly 110 and measures imbalance of the rotating biological contactor 102 more directly than known systems. In contrast, other sensors measure of load output of a motor and are blind to the efficiency loss of the drivetrain. In alternative embodiments, sensor assembly 114 has any configuration that enables system 134 to operate as described herein. For example, in some embodiments, sensor 138, controller 136, and/or any other parts of sensor assembly 114 are coupled to a modular torque arm.

In the exemplary embodiment, first end 142 is coupled to gearbox assembly 110 at a radial distance 148 from rotation axis 130 of rotatable shaft 118 (shown in FIG. 2). Second end 144 is coupled to brace 146 such that body 140 and sensor 138 extend along a longitudinal axis 150 between brace 146 and gearbox assembly 110. Longitudinal axis 150 extends at an angle α relative to a vertical direction of system 134, in reference to the orientation shown in FIG. 3. Sensor assembly 114 is configured to maintain gearbox assembly 110 in position during rotation of rotatable shaft 118 (shown in FIG. 2). For example, gearbox assembly 110 is positioned at an angle β, in reference to the orientation shown in FIG. 3. Angle β is defined between a horizontal direction 152 of rotating biological contactor 102 (shown in FIGS. 1 and 2) and a line parallel to a flat top surface of housing 132 of gearbox assembly 110. Because the top surface of the gearbox housing is generally parallel to the line connecting the output shaft axis and the axis of the torque arm mounting point relative to the horizontal, angle β approximates the gearbox moment arm angle. In some embodiments, the gearbox moment arm angle is measured directly and used. In alternative embodiments, sensor assembly 114 and gearbox assembly 110 are positioned in any manner that enables system 134 to operate as described herein.

Also, in the exemplary embodiment, controller 136 is communicatively coupled to sensor 138 of sensor assembly 114 and is configured to communicate with sensor 138. The communicative coupling may be by any suitable communication channel, including, without limitation, analog or digital channels, serial or parallel channels, wired or wireless channels, or any other suitable means for establishing communication between sensor 138 and controller 136. For example, in certain embodiments, sensor 138 and controller 136 may be communicatively coupled by a USB, near field communication (NFC), or Ethernet connection. In one embodiment, a cable 154 extends between and connects controller 136 and sensor 138. Controller 136 is configured to receive analog or digital signals related to the load, or strain, on sensor 138. Sensor 138 generates an electrical signal based on the load when rotatable shaft 118 (shown in FIG. 2) is rotated and sends the signal through cable 154 to controller 136. Cable 154 includes one or more optical or electrical conductors for transmitting and receiving the signals between controller 136 and sensor 138. In alternative embodiments, controller 136 and sensor 138 are coupled together in any manner that enables system 134 to operate as described herein. For example, in some embodiments, controller 136 and sensor 138 communicate wirelessly. In further embodiments, at least a portion of controller 136 is incorporated into sensor assembly 114.

In addition, in the exemplary embodiment, controller 136 is configured to determine a torque of rotatable shaft 118 (shown in FIG. 2) based on the load detected by sensor 138, based on angle α of sensor 138, based on angle β of gearbox assembly 110, and based on radial distance 148 between first end 142 and rotation axis 130. For example, controller 136 uses angles α, β and radial distance 148 to determine the lever arm distance (i.e., perpendicular distance between rotation axis 130 and the line of action of the force). The determined value for the lever arm distance is multiplied by the load to determine the torque (i.e., the measure of force required to rotate rotor 108). Controller 136 determines the load based on the signal received from sensor 138. Angles α, β and radial distance 148 may be input into controller 136 during configuration of system 134. For example, an operator measures angle α, β and/or radial distance 148 when sensor assembly 114 is coupled to brace 146 and gearbox assembly 110 and inputs the measurements into controller 136. In other embodiments, at least one of angle α, β and radial distance 148 is automatically determined based on sensed information and/or specifications of gearbox assembly 110. For example, in some embodiments, values of radial distance 148 for one or more gearbox assemblies 110 are stored in controller 136 and radial distance 148 is selected based on the particular gearbox assembly 110 in use. In further embodiments, system 134 includes an accelerometer (not shown) configured to determine angle α and angle α is not required to be input by a user. In alternative embodiments, controller 136 determines torque in any manner that enables system 134 to operate as described herein.

Controller 136 is further configured to analyze the torque of rotating biological contactor and provide reports to an operator. In some embodiments, controller 136 determines rotational positions of rotatable shaft 118 (shown in FIG. 2) and correlates the determined torque to the rotational positions of rotatable shaft 118. Accordingly, system 134 facilitates an operator identifying and addressing an imbalance in rotating biological contactor 102 (shown in FIG. 2). For example, large variances in determined torque across the rotational positions indicates an imbalance of the load on gearbox assembly 110 and motor 112. Conversely, for example, steady torque across the rotational positions indicates a balanced load.

Figure 4:
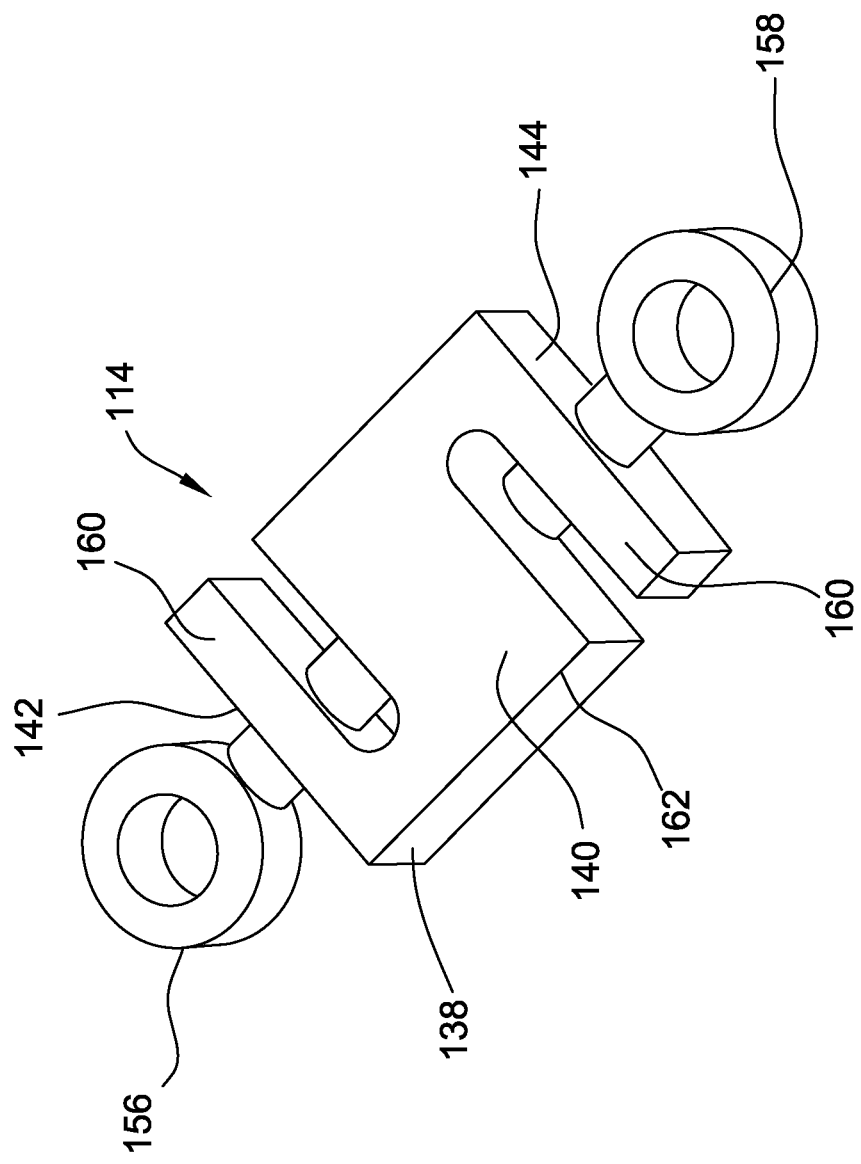
FIG. 4 is a perspective view of a sensor of the system shown in FIG. 3.

FIG. 4 is a perspective view of sensor 138 of system 134. First end 142 includes a first coupling member 156 and second end 144 includes a second coupling member 158. For example, first and second coupling members 156, 158 are rod ends that receive bolts (not shown) of gearbox assembly 110 (shown in FIG. 3) and brace 146 (shown in FIG. 3), respectively. In addition, coupling members 156, 158 are adjustable by, for example, rotating threaded members of coupling members 156, 158 to provide tolerances for the gap between brace 146 and gearbox assembly 110. Accordingly, first and second coupling members 156, 158 allow sensor assembly 114 to be releasably coupled to gearbox assembly 110 in place of a torque arm. In alternative embodiments, sensor 138 includes any coupling member 156, 158 that enables sensor 138 to function as described herein.

Also, in the exemplary embodiment, body 140 is substantially S-shaped with opposed arms 160 on first and second ends 142, 144, respectively, and a trunk 162 between first end 142 and second end 144. Accordingly, a load is transferred through body 140 along a substantially S-shaped path and is detected by sensor 138. In the exemplary embodiment, a load cell is located within trunk 162 and generates a signal based on at least one of a tension force and a compression force on body 140. For example, in some embodiments, the load cell is a bi-directional load cell and is configured to generate signals when sensor 138 experiences tension and compression. In alternative embodiments, sensor 138 has any configuration that enables sensor assembly 114 to operate as described herein.

Figure 5:
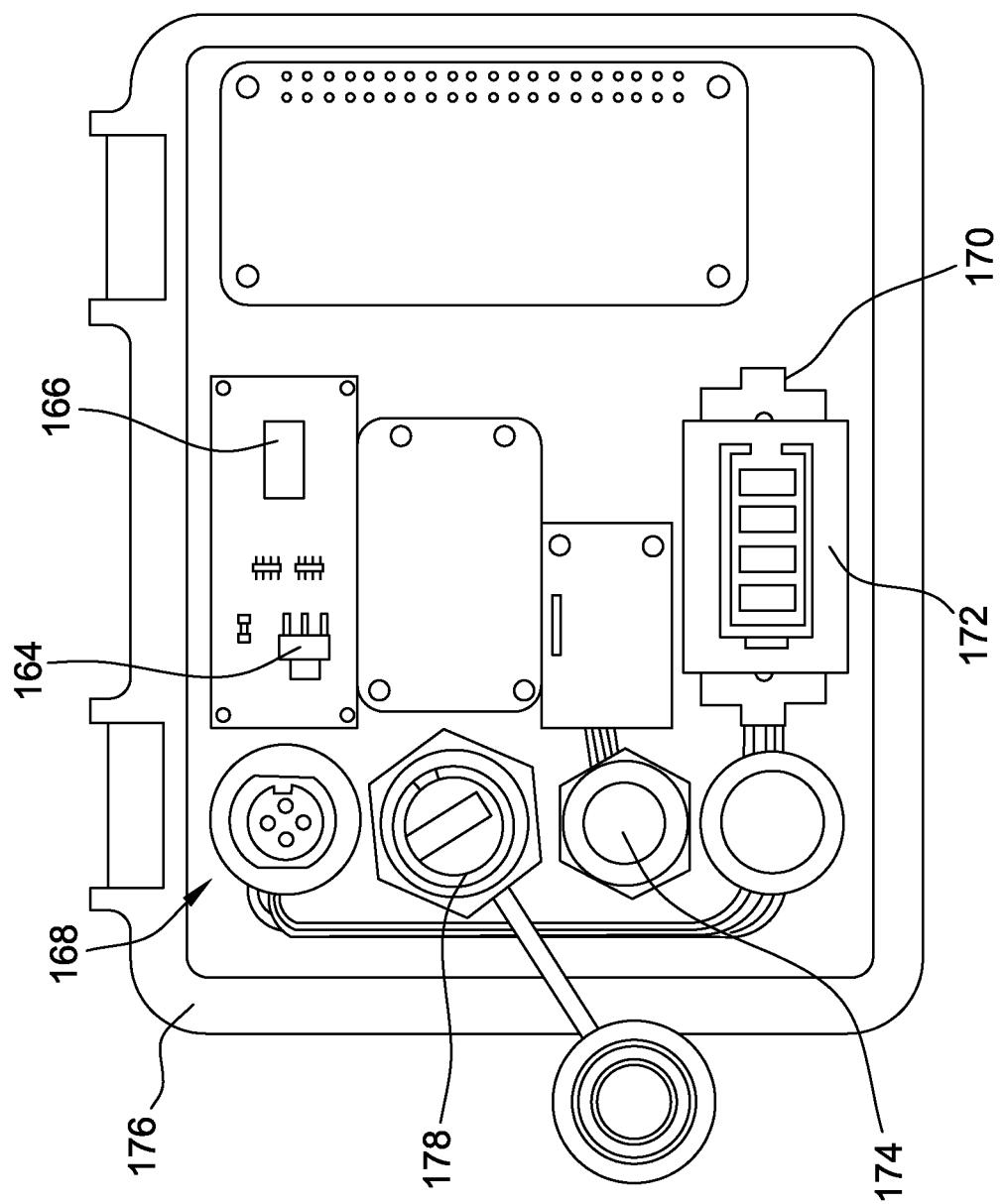
FIG. 5 is a top view of a controller of the system shown in FIG. 3.

FIG. 5 is a top view of controller 136 of system 134. In the exemplary embodiment, controller 136 includes one or more processors 164, one or more memory devices 166, a communication interface 168, a power source 170, a display 172, an ON/OFF switch 174, and a housing 176. Housing 176 defines an interior space for housing components of controller 136. Accordingly, controller 136 is portable, i.e., transportable as a single unit without substantial disassembly and/or reassembly. For example, during assembly of system 134, controller 136 is positioned within reach of sensor 138 (i.e., within a wireless signal range and/or within the length of cable 154) and turned on. In some embodiments, cable 154 (shown in FIG. 3) is connected to an input port of communication interface 168. In alternative embodiments, controller 136 has any configuration that enables system 134 to operate as described herein. For example, in some embodiments, at least some components of controller 136 are incorporated into sensor assembly 114 (shown in FIG. 3).

Also, in the exemplary embodiment, communication interface 168 may include one or more wired or wireless hardware interface, such as, for example, universal serial bus (USB), RS232 or other serial bus, CAN bus, Ethernet, near field communication (NFC), WiFi, Bluetooth, or any other suitable digital or analog interface for establishing one or more communication channels between controller 136 and sensor 138 and/or remote devices. Remote devices may include, for example and without limitation, a system controller, smart phone, personal computer, mass storage system, cloud server, or any other suitable computing system. Communication interface 168 may include, for example, a wired communication channel to the remote device or an antenna for establishing a wireless communication channel with the remote device. Communication interface 168 further includes a software or firmware interface for receiving one or more control parameters and writing them, for example, to memory. In certain embodiments, communication interface 168 includes, for example, a software application programming interface (API) for supplying one or more parameters for operating system 134.

In addition, in the exemplary embodiment, power source 170 is configured to provide power for operation of components of controller 136. In the exemplary embodiment, power source 170 includes a battery that receives and stores power from an external power supply. For example, controller 136 includes a power port 178 for connecting the external power supply to controller 136 and charging power source 170. In alternative embodiments, controller 136 receives power from any power source 170 that enables controller 136 to operate as described herein. For example, in some embodiments, controller 136 and/or sensor assembly 114 (shown in FIG. 3) receive power from an external motor. In such embodiments, the motor power may be alternating current with a voltage between 100V and 500V and be converted to suitable direct current power for controller 136 and/or sensor assembly 114.

Note that Generation II of the product may integrate the controller into the sensor body eliminating the "umbilical cord" between the two components and increasing the form factor of the product while further removing cost.

Figure 6:
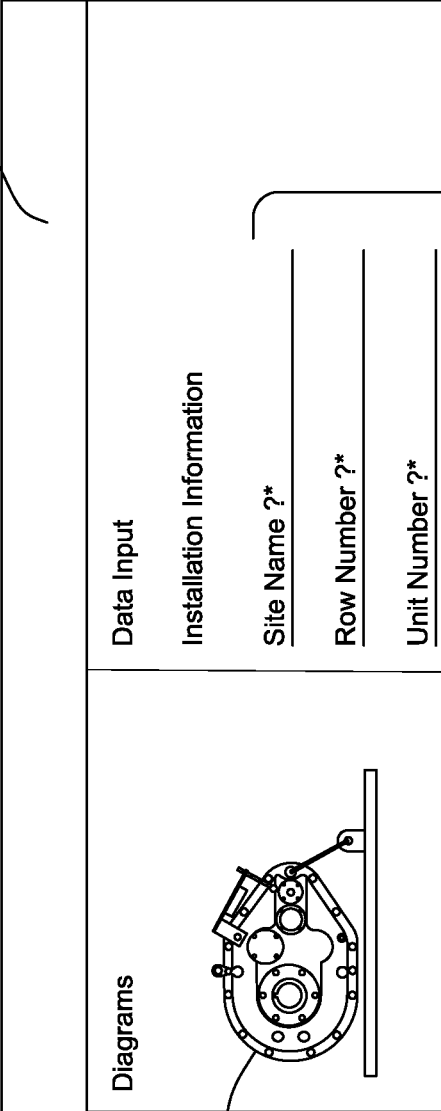
FIG. 6 is an input module of a user interface for use with the system shown in FIG. 3.
Figure 7:
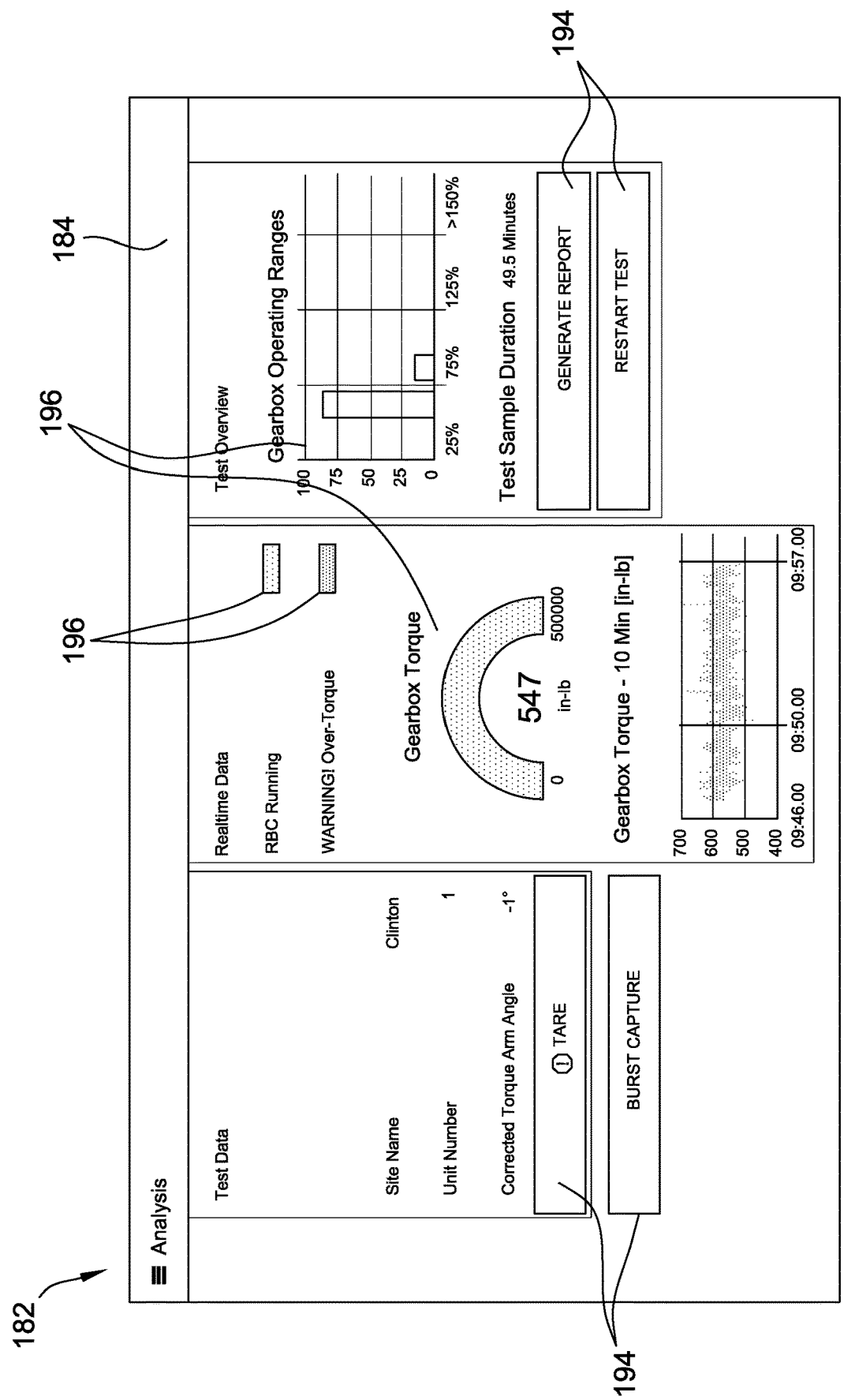
FIG. 7 is an analysis module of the user interface shown in FIG. 6.
Figure 8:
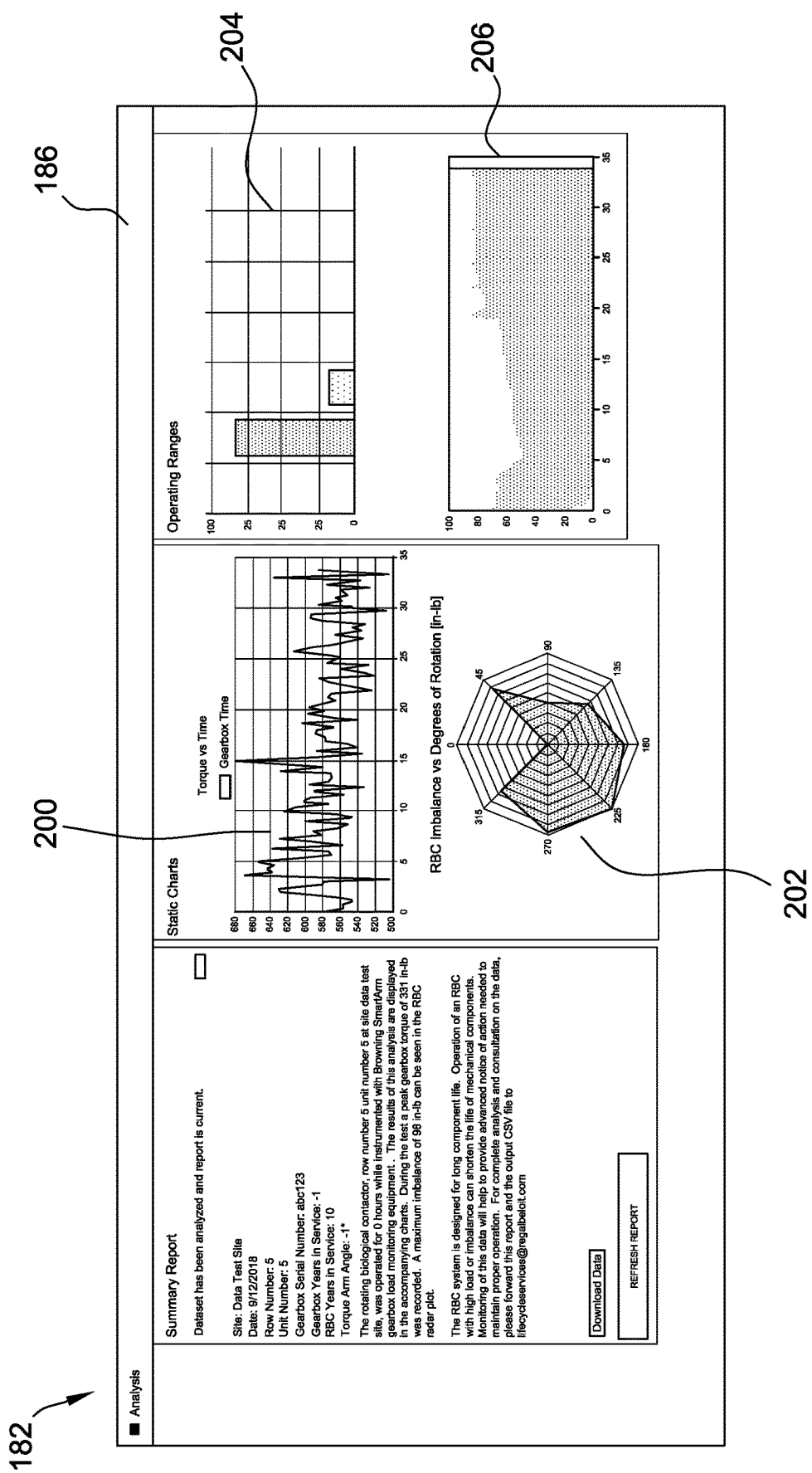
FIG. 8 is an output module of the user interface shown in FIG. 6.

FIG. 6 is an input module 180 of a user interface 182 for use with system 134 (shown in FIG. 3). FIG. 7 is an analysis module 184 of user interface 182. FIG. 8 is an output or report module 186 of user interface 182. In some embodiments, user interface 182 may be incorporated into sensor assembly 114 (shown in FIG. 3), controller 136 (shown in FIG. 5), and/or a remote device (not shown). In the exemplary embodiment, user interface 182 is provided on a personal computing device such as smart phone, tablet, or computer. Accordingly, controller 136 is configured to communicate with the personal computing device using a wireless and/or wired connection to exchange information with user interface 182.

User interface 182 includes one or more modules that provide information to and/or receive inputs from the operator. For example, input module 180 includes inputs 188 for "Site Name," "Row Number," "Unit Number," "Gearbox Serial Number," "Gearbox Years in Service," "RBC (Rotating Biological Contactor) Years in Service," "Gearbox Angle," and "Torque Arm Angle." The initial inputs, "Site Name," "Row Number," "Unit Number," and "Gearbox Serial Number," are identifying inputs that reference a specific unit test and facilitate retrieving information. The years in service of the gearbox and RBC may be used to project remaining service life and other analysis of the data. The angle measurements are used by controller 136 (shown in FIG. 3) to determine and analyze torque as described above. In alternative embodiments, user interface 182 receives any inputs that enable user interface 182 to function as described herein. For example, in some embodiments, input module 180 allows operators to enter distance measurements such as radial distance 148.

Also, input module 180 includes one or more diagrams 190 to facilitate operators' understanding of the input information. For example, diagrams 190 show the angle measurements required for inputs 188. In alternative embodiments, user interface 182 includes any input modules 180 that enable user interface 182 to operate as described herein.

In addition, user interface 182 includes one or more analysis modules 184 that include one or more graphs 192 that display data as the data is collected and/or analyzed. For example, graphs 192 display torque during time intervals of a test run. In addition, analysis module 184 includes one or more control inputs or buttons 194. For example, buttons 194 allow an operator to tare or zero the operating settings of the system, change a reporting mode, generate a report, and/or restart a test. In some embodiments, buttons 194 provide a "Burst Capture" mode in which a relatively high-frequency sample of data (e.g., at 10 hertz rather than at 0.5 Hz under the standard operating mode) is taken for a shortened time, e.g., 1 minute or less. Such "Burst Capture" mode enables gathering and analysis data for startup torque overloads of the drivetrain and/or or a high-resolution capture of 1.5 output cycles.

In addition, analysis module 184 may display identifying information such as a site name and unit number. Data may be displayed as raw data (e.g., numbers) and/or in a graphical representation. In addition, analysis module 184 includes one or more indicators 196 that provide information such as operating state (e.g., on/off) of rotating biological contactor 102 (shown in FIG. 2) and/or warnings based on detected torque level. In some embodiments, indicators 196 are provide on a remote computing device via e-mail, short message services (SMS) and/or any other suitable communication means.

Also, in the exemplary embodiment, user interface 182 includes report module 186 which provides a report based on the determinations of controller 136 (shown in FIG. 5). For example, report module 186 includes one or more graphs. A first graph 200 charts torque of rotating biological contactor 102 (shown in FIG. 2) with respect to time. A second graph 202 displays a graphical representation of rotating biological contactor imbalance versus degrees of rotation of rotor 108. The imbalance of rotor 108 (shown in FIG. 2) is determined by controller 136 (shown in FIG. 3) based on the determined torque and variances in the determined torque throughout rotation of rotor 108. In addition, third and fourth graphs 204, 206 display operating ranges of torque (in percentages) for specified times. In alternative embodiments, user interface 182 includes any reports that enable user interface 182 to function as described herein.

In some embodiments, controller 136 provides an expected life of rotating biological contactor 102. In some embodiments, the expected life is a number of years. In further embodiments, controller 136 provides a prediction of gearbox life in comparison to expected gearbox life under standard conditions (e.g., determining that a heavily loaded gearbox may have 50% life remaining after 5 years of use and a lightly loaded gearbox may have 75% life remaining after 5 years of use).

Figure 9:
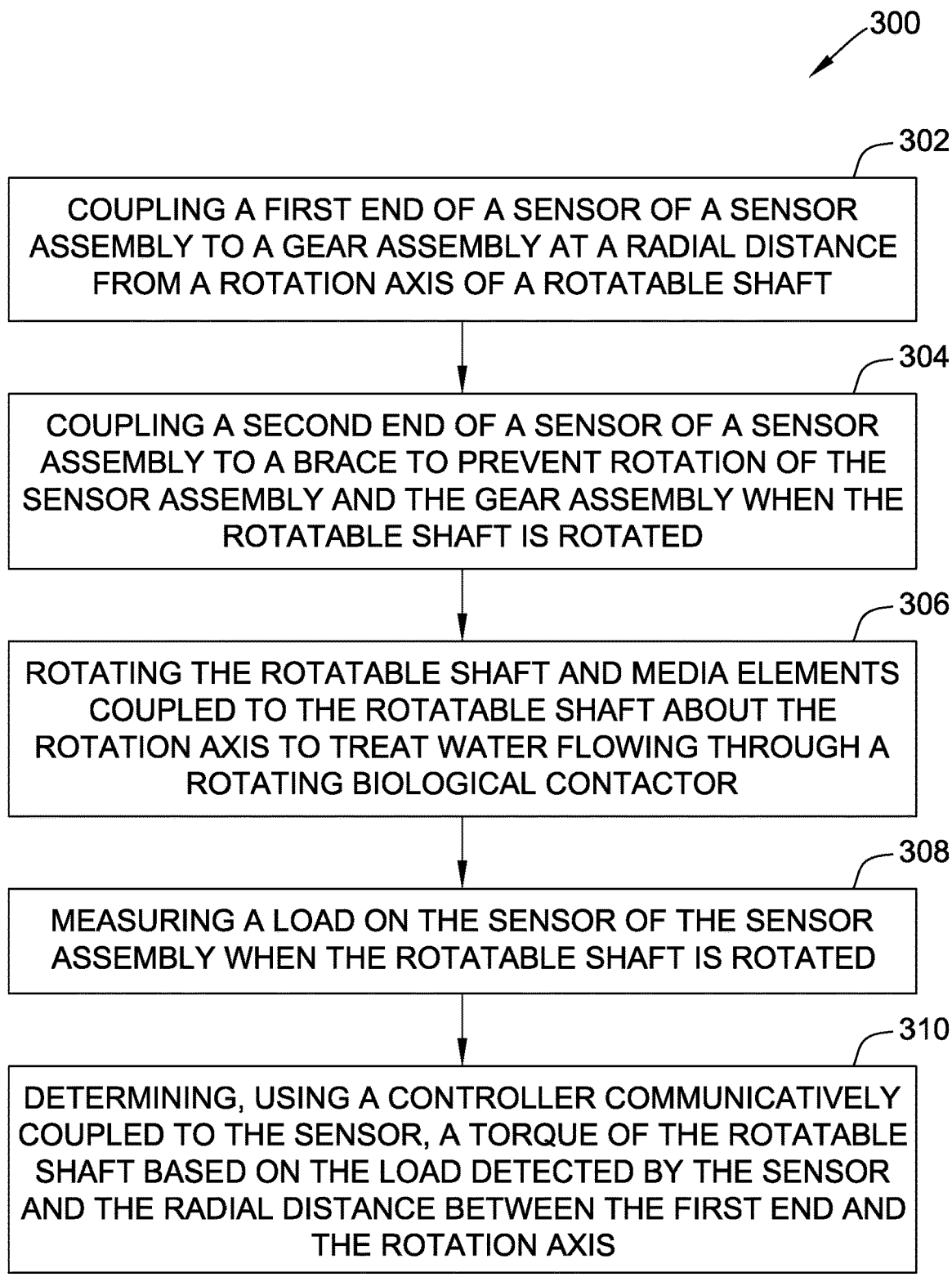
FIG. 9 is a flow diagram of an exemplary method of determining operating conditions of the rotating biological contactor shown in FIG. 2.

FIG. 9 is a flow diagram of an example method 300 for determining operating conditions of rotating biological contactor 102 (shown in FIG. 2). With reference to FIGS. 2, 3, and 9, method 300 includes coupling 302 first end 142 of sensor 138 of sensor assembly 114 to gearbox assembly 110 at radial distance 148 from rotation axis 130 of rotatable shaft 118 and coupling 304 second end 144 of sensor 138 of sensor assembly 114 to brace 146 to prevent rotation of sensor assembly 114 and gearbox assembly 110 when rotatable shaft 118 is rotated. Also, method 300 includes rotating 306 rotatable shaft 118 and media elements 120 about rotation axis 130 to treat water in basin 104 and in contact with rotating biological contactor 102. In addition, method 300 includes measuring 308 a load on sensor 138 of sensor assembly 114 when rotatable shaft 118 is rotated. The load is transferred through sensor 138 along longitudinal axis 150 to brace 146.

Also, method 300 includes determining 310, using controller 136 communicatively coupled to sensor 138, a torque of rotatable shaft 118 based on the load detected by sensor 138 and radial distance 148 between first end 142 and rotation axis 130. In alternative embodiments, controller 136 determines torque in any manner that enables system 134 to operate as described herein. For example, in some embodiments, controller 136 determines torque based on angle α of sensor 138 and/or angle β of gearbox assembly 110.

Figure 10:
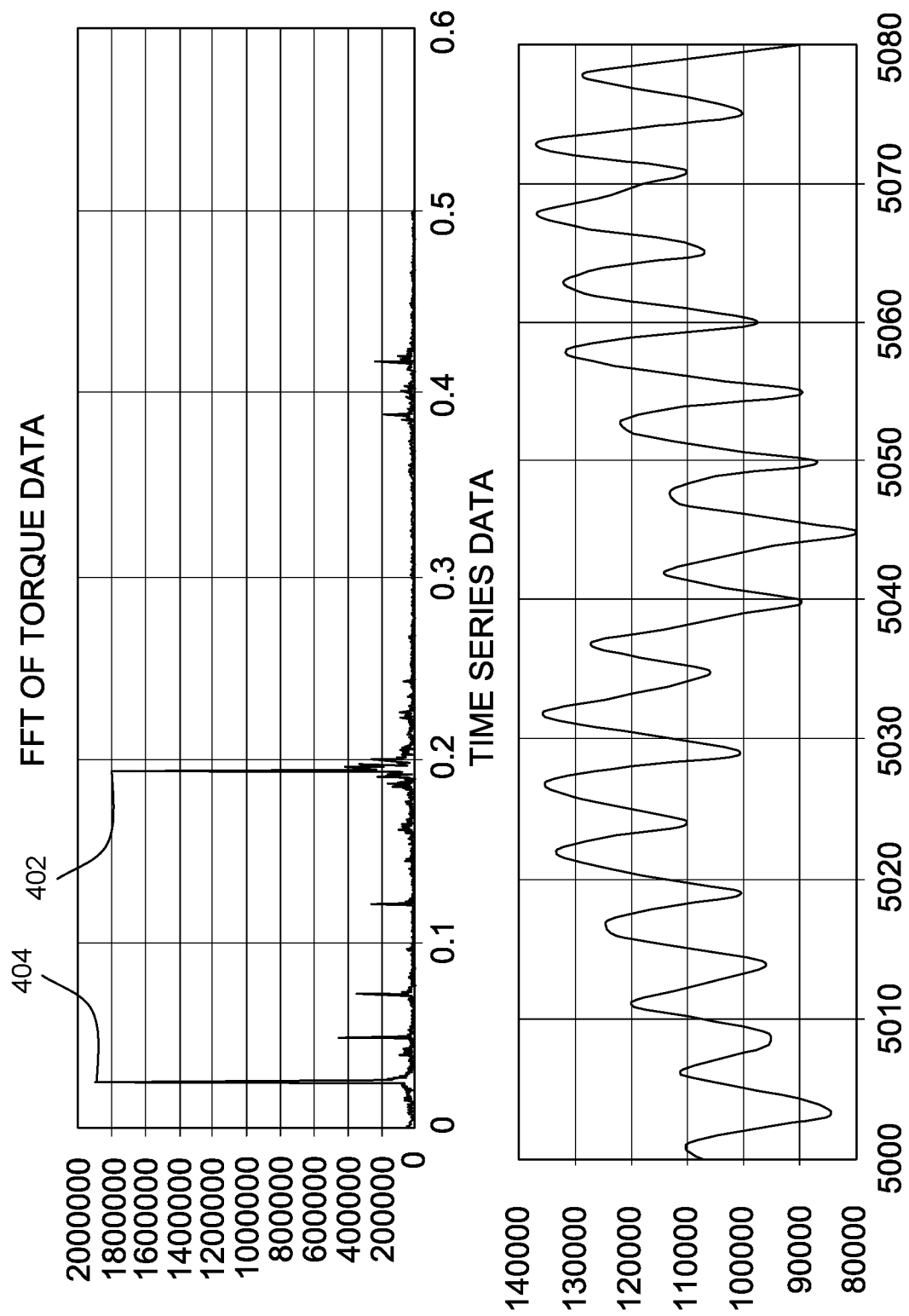
FIG. 10 is a graphical representation of loading on a rotating biological contactor.
Figure 11:
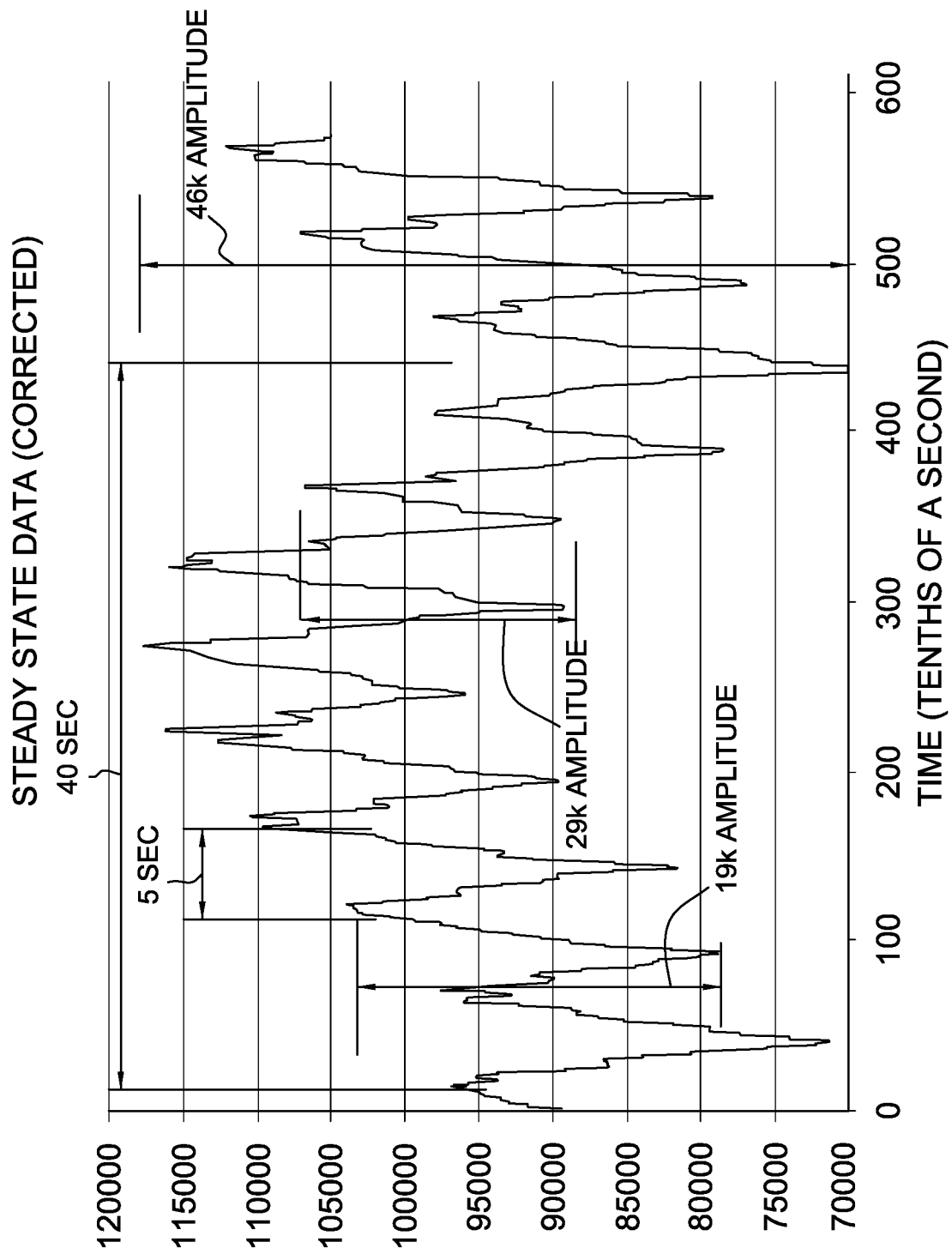
FIG. 11 is a graphical representation of an analysis of torque versus time for a rotating biological contactor.
Figure 12:
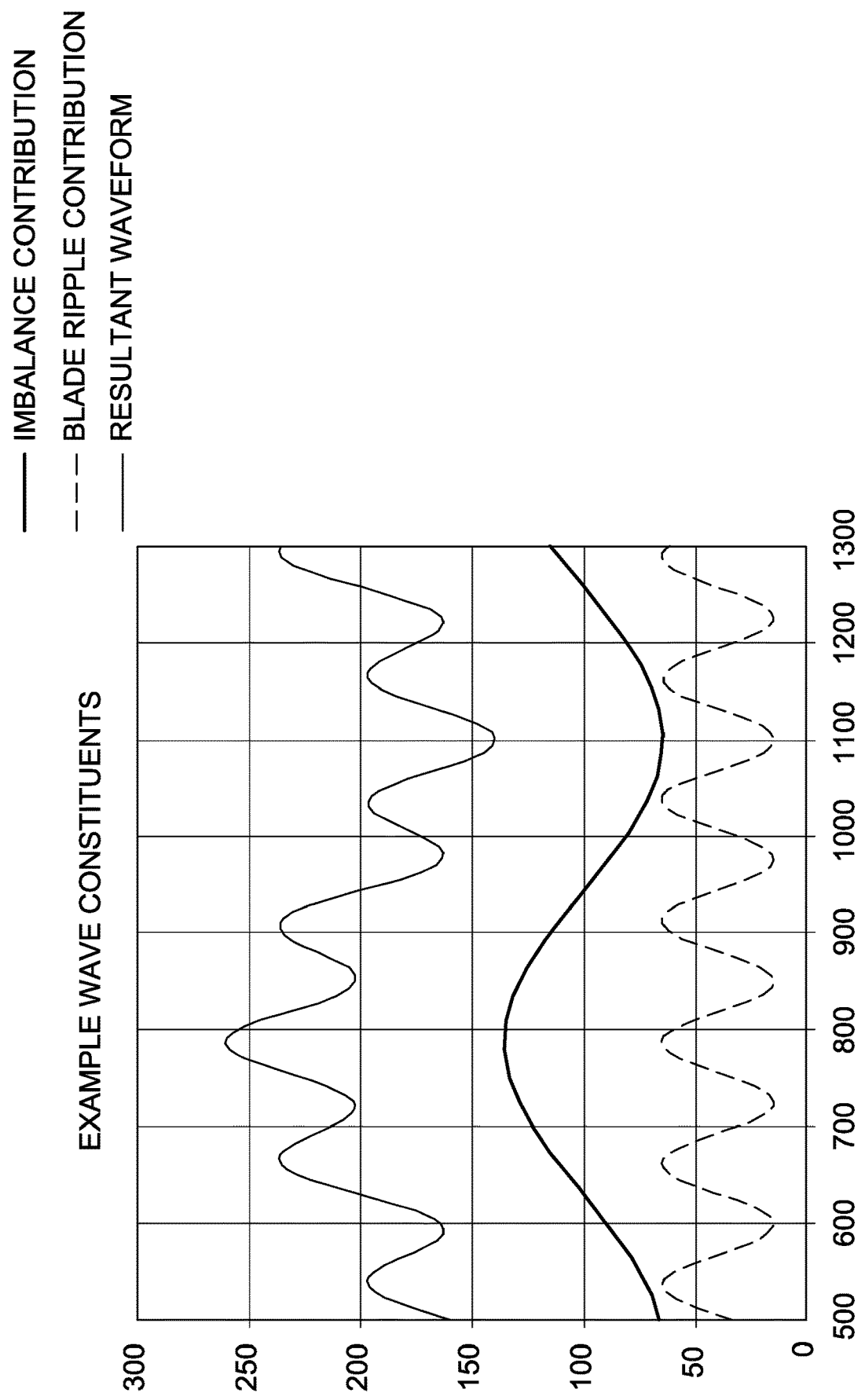
FIG. 12 is a graphical representation of loading on a rotating biological contactor segregated into waveform constituents.

FIG. 10 is a graphical representation of loading on a rotating biological contactor. Specifically, FIG. 10 includes a graph of time series data showing torque versus time and a graph of a "Fast Fourier Transform" (FFT) of torque. FIG. 11 is a graphical representation of an analysis of torque versus time for a rotating biological contactor. FIG. 12 is a graphical representation of loading on rotating biological contactor 102 (shown in FIG. 2) segregated into waveform constituents. In some embodiments, controller 136 (shown in FIG. 5) is configured to identify constituents of the torque load on rotating biological contactor 102 (shown in FIG. 2) and perform a Fourier analysis. For example, portions of the aggregated torque signal may be separated into different constituents such as ""Imbalance" and "Blade Ripple", as shown in FIG. 12. In addition, using the Fourier analysis, controller 136 is able to distinguish peaks 402 generated when water is passed by the lobes of media elements 120 (shown in FIG. 2) of rotating biological contactor 102 (shown in FIG. 2) from peaks 404 showing the imbalance which results from material being unevenly distributed across the rotor drum. As a result, controller 136 enables more accurate determination of the torque load that is attributable to imbalance of rotating biological contactor 102.

The methods and systems described herein provide technical effects and advantages over known methods and systems. For example, the technical effects may include at least one of: (a) enabling the determination of torque on a rotor of a rotating biological contactor; (b) identifying load imbalances on a rotor of a rotating biological contactor; (c) prolonging service life of components of a rotating biological contactor; (d) providing information on operating conditions of a rotating biological contactor; (e) providing a sensor assembly for detecting operating conditions of rotors that is less expensive than at least some known sensor assemblies; (f) providing a sensor assembly that is simpler to install than at least some known sensor assemblies; and (g) providing a prediction of gearbox life in comparison to expected gearbox life under standard conditions.

As used herein, an element or step recited in the singular and preceded with the word "a" or "an" should be understood as not excluding plural elements or steps, unless such exclusion is explicitly recited.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for determining operating conditions of a rotating biological contactor, the rotating biological contactor including a rotatable shaft, a plurality of media elements coupled to the rotatable shaft, and a gearbox assembly coupled to the rotatable shaft to cause rotation of the rotatable shaft, the system comprising:
   a sensor coupleable to the gearbox assembly of the rotating biological contactor, said sensor comprising:
      a first end including a first coupling member releasably coupleable to the gearbox assembly at a first connection location at a radial distance from a rotation axis of the rotatable shaft, wherein the rotatable shaft rotates the plurality of media elements about the rotation axis to treat water within a basin of the rotating biological contactor, wherein the gearbox assembly defines a centerline extending between the rotation axis and the first connection location;
      a second end including a second coupling member releasably coupleable to a brace to prevent rotation of said sensor and the gearbox assembly when the rotatable shaft is rotated; and
      a body extending between said first end and said second end, said sensor adapted to act as a torque arm for the gearbox assembly, wherein at least one of said first coupling member and said second coupling member is adjustable to change a length of said sensor, wherein said sensor is configured to resist rotation of the gearbox assembly and detect a torque load on said body and the gearbox assembly when the rotatable shaft is rotated, wherein said sensor extends along a longitudinal axis between the brace and the gearbox assembly, and wherein the longitudinal axis extends at an obtuse first angle relative to the centerline of the gearbox assembly; and
   a controller communicatively coupled to said sensor, said controller including a processor and a memory, wherein said controller is configured to determine a torque of the rotatable shaft based on the torque load detected by said sensor.

2. The system of claim 1 further comprising a user interface configured to display a graphical representation of the torque.

3. The system of claim 2, wherein said controller is further configured to identify an imbalance of the rotatable shaft during rotation of the rotatable shaft, wherein said user interface is configured to display a graphical representation of the imbalance.

4. The system of claim 1, wherein said sensor includes a load cell configured to measure at least one of a tension force and a compression force on said sensor.

5. The system of claim 1, wherein said controller determines rotational positions of the rotatable shaft and correlates the torque to the rotational positions of the rotatable shaft.

6. The system of claim 1, wherein said controller is mounted to said body of said sensor.

7. The system of claim 1, wherein said controller further includes a communication interface to communicate with said sensor.

8. A drive system for a rotating biological contactor comprising:
   a gearbox assembly coupled to a rotatable shaft extending at least partially along a basin for the rotating biological contactor;
   a motor coupled to said gearbox assembly and configured to drive rotation of said rotatable shaft via said gearbox assembly; and
   a sensor coupled to said gearbox assembly, said sensor comprising:
      a first end including a first coupling member releasably coupled to said gearbox assembly at a first connection location at a radial distance from a rotation axis of said rotatable shaft, wherein said gearbox assembly defines a centerline extending between the rotation axis and the first connection location;

a second end including a second coupling member releasably coupled to a brace to prevent rotation of said sensor and said gearbox assembly when said rotatable shaft is rotated; and a body extending between said first end and said second end, said sensor adapted to act as a torque arm for said gearbox assembly, wherein at least one of said first coupling member and said second coupling member is adjustable to change a length of said sensor, wherein said sensor is configured to resist rotation of said gearbox assembly and detect a torque load on said body and said gearbox assembly when said rotatable shaft is rotated, wherein said sensor extends along a longitudinal axis between said brace and said gearbox assembly, and wherein the longitudinal axis extends at an obtuse first angle relative to said centerline of said gearbox assembly.

9. The drive system of claim 8 further comprising a controller communicatively coupled to said sensor, said controller including a processor and a memory, wherein said controller is configured to determine a torque of said rotatable shaft based on the torque load detected by said sensor and the radial distance between said first end and the rotation axis previously input into said controller.

10. The drive system of claim 9 further comprising a user interface configured to display a graphical representation of the torque.

11. The drive system of claim 10, wherein said controller determines rotational positions of said rotatable shaft and correlates the torque to the rotational positions of said rotatable shaft throughout the rotation of said rotatable shaft.

12. The drive system of claim 11, wherein said user interface is configured to display a graphical representation of the rotational positions of said rotatable shaft.

13. The drive system of claim 8, wherein said gearbox assembly comprises a housing and a plurality of gears within said housing, and wherein said first end is coupled to said housing and said rotatable shaft extends at least partially into an interior of said housing.

14. The drive system of claim 13, wherein said sensor includes a load cell configured to measure at least one of a tension force and a compression force on said sensor.

15. The drive system of claim 8, wherein a controller is mounted to said body of said sensor.

16. A method for determining operating conditions of a rotating biological contactor, the rotating biological contactor including a rotatable shaft, a plurality of media elements coupled to the rotatable shaft, and a gearbox assembly coupled to the rotatable shaft to cause rotation of the rotatable shaft, the method comprising:

releasably coupling a first coupling member of a first end of a sensor to the gearbox assembly at a first connection location at a radial distance from a rotation axis of the rotatable shaft, the sensor adapted to act as a torque arm for the gearbox assembly, wherein the gearbox assembly defines a centerline extending between the rotation axis and the first connection location;

releasably coupling a second coupling member of a second end of the sensor to a brace to prevent rotation of the sensor and the gearbox assembly when the rotatable shaft is rotated, wherein the sensor extends along a longitudinal axis between the brace and the gearbox assembly, and wherein the longitudinal axis extends at an obtuse first angle relative to the centerline of the gearbox assembly, wherein at least one of the first coupling member and the second coupling member is adjustable to change a length of the sensor;

rotating the rotatable shaft and the plurality of media elements about a rotation axis to treat water flowing through the rotating biological contactor;

measuring a torque load on the sensor when the rotatable shaft is rotated; and determining, using a controller communicatively coupled to the sensor, a torque of the rotatable shaft based on the torque load detected by the sensor and the radial distance between the first end and the rotation axis.

17. The method of claim 16 further comprising displaying a graphical representation of the torque on a user interface.

18. The method of claim 16 further comprising identifying an imbalance of the rotatable shaft during rotation of the rotatable shaft.

19. The method of claim 16, wherein measuring the torque load on the sensor comprises measuring at least one of a tension force and a compression force on the sensor.

20. The method of claim 16 further comprising determining rotational positions of the rotatable shaft and comparing the torque to the rotational positions of the rotatable shaft.

* * * * *